(12) United States Patent
Gan

(10) Patent No.: US 11,093,127 B2
(45) Date of Patent: Aug. 17, 2021

(54) SYSTEM AND METHOD FOR AN INTELLIGENT DRAG AND DROP DESIGNER

(71) Applicant: Nintex USA, Inc., Bellevue, WA (US)

(72) Inventor: KokKoon Gan, Punggol (SG)

(73) Assignee: Nintex UK Ltd., London (GB)

( * ) Notice: Subject to any disclaimer, the term of this patent is extended or adjusted under 35 U.S.C. 154(b) by 0 days.

(21) Appl. No.: 16/802,390

(22) Filed: Feb. 26, 2020

(65) Prior Publication Data

US 2020/0272294 A1 Aug. 27, 2020

Related U.S. Application Data

(60) Provisional application No. 62/810,460, filed on Feb. 26, 2019.

(51) Int. Cl.
  *G06F 3/0486* (2013.01)
  *G06F 3/0482* (2013.01)
  *G06F 3/0488* (2013.01)

(52) U.S. Cl.
  CPC .......... *G06F 3/0486* (2013.01); *G06F 3/0482* (2013.01); *G06F 3/0488* (2013.01)

(58) Field of Classification Search
  CPC ..... G06F 3/0486; G06F 3/0482; G06F 3/0488
  See application file for complete search history.

(56) References Cited

U.S. PATENT DOCUMENTS

| 5,416,900 | A | * | 5/1995 | Blanchard | G06T 11/00 345/156 |
| 5,604,907 | A | * | 2/1997 | Conner | G06F 9/4488 719/317 |
| 6,380,951 | B1 | * | 4/2002 | Petchenkine | G06F 3/1204 715/736 |
| 2006/0107265 | A1 | * | 5/2006 | Schulz | G06Q 10/06 718/100 |
| 2006/0143611 | A1 | * | 6/2006 | Sadiq | G06Q 10/063 718/100 |
| 2006/0167938 | A1 | * | 7/2006 | Muller | G06Q 10/06 |
| 2007/0245300 | A1 | * | 10/2007 | Chan | G06Q 10/06 717/105 |
| 2013/0152021 | A1 | * | 6/2013 | Hatfield | G06Q 10/0633 715/843 |
| 2016/0092059 | A1 | * | 3/2016 | Tu | G06F 16/252 715/738 |

\* cited by examiner

*Primary Examiner* — Shen Shiau
(74) *Attorney, Agent, or Firm* — Newman Du Wors LLP

(57) ABSTRACT

Embodiments are provided for a design tool with built-in intelligence that automatically senses the location of one or more placeholders for selectable actions when designing a form or workflow. The design tool intuitively determines which placeholder should logically be used next; visually emphasizes, when an action is selected, the location and designation of the placeholder predicted to be used next; visually emphasizes alternative placeholders relevant to the position of the selected action by detecting minor changes in the position of the selected action; and automatically positions the selected action into the predicted or selected placeholder when the action is released.

20 Claims, 8 Drawing Sheets

SYSTEM AND METHOD FOR AN INTELLIGENT DRAG AND DROP DESIGNER

CROSS-REFERENCE TO RELATED APPLICATION(S)

This application claims benefit to U.S. Provisional Application No. 62/810,460, filed on Feb. 26, 2019, entitled "System and Method for an Intelligent Drag and Drop Designer" the contents of which are incorporated by reference herein as though set forth in their entirety, and to which priority and benefit are claimed.

FIELD OF USE

The present disclosure relates generally to the field of customized workflow process technology. More specifically, the present disclosure relates to new systems and methods for an intelligent designer that improves computer functionality and use for creating and designing workflow processes and electronic forms; making a user's design process more intuitive, quicker, and easier.

BACKGROUND

Dynamic forms and workflows can be created on low-code development platforms or via full code implementations, enabling a user to automate many processes in a way that dramatically enhances productivity and efficiency in any industry. Forms are made up of multiple actions positioned in a specific order to increase efficiency and effectiveness of use. Similarly, workflows are made up of multiple actions sequenced in a specific order to bring about the desired solution. Designing a customized form or workflow often requires familiarity with the specific task or purpose the form/workflow is addressing as well as technical knowledge and experience in designing the form/workflow. At times, a workflow or form can become large and/or intricate, creating the potential for incorrect placement or inadvertent omission of actions. As a result, the design process can be tedious and challenging work, requiring technical experience and careful attention to the placement of individual actions within the overall form/workflow. This potential for error is increased because current design tools are rudimentary in the features they offer, cumbersome when used, or lack built-in intuition that enables ease of use. Specifically, design canvasses that require a user to drag and drop workflow or form actions with pinpoint accuracy pose inherent difficulties in the design process, leading to user frustration and errors.

Thus, what is needed is are systems and methods for a design tool with built-in intelligence that automatically senses the location of one or more placeholders for selectable actions when designing a form or workflow; intuitively determines which placeholder should logically be used next; visually emphasizes, when an action is selected, the location and designation of the placeholder predicted to be used next; visually emphasizes alternative placeholders relevant to the position of the selected action by detecting minor changes in the position of the selected action; and automatically positions the selected action into the predicted or selected placeholder when the action is released. Such systems and methods will also improve communication technology between the networks and servers of the separate users dependent on the procedure for designing the form or workflow, allowing for increased understanding, implementation, and engagement across organizational boundaries.

SUMMARY

The following presents a simplified overview of example embodiments in order to provide a basic understanding of some aspects of the invention. This overview is not an extensive overview of the example embodiments. It is not intended to identify key or critical elements of the example embodiments or delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In accordance with the embodiments disclosed herein, the present disclosure is related to systems and methods for an intelligent workflow and form designer that provides a movable action; displays one or more placeholders for insertion of the movable action; generates and displays a visual emphasizing aid around one of the placeholders upon selection of the movable action; increases the emphasis of the visual aid in accordance with the movement of the selected action, changing emphasis from one placeholder to another in accordance with the proximity of the selected action to the one or more placeholders; and inserts the selected movable action into the emphasized placeholder upon release of the selected action.

In one embodiment, A system for an intelligent designer comprises a computer system having a hardware processor and a physical memory using executable instructions that, as a result of being executed by the hardware processor, cause the computer system to: generate and display, via the hardware processor, a graphical user interface comprising a design canvas, wherein the design canvas comprises at least one movable action and one or more placeholders for the at least one movable action; identify, via the hardware processor, when a movable action has been selected; in response to identifying that a movable action has been selected, generate and display a visual emphasizing aid surrounding a single placeholder; determine when the selected movable action has been released; and in response to determining that the selected movable action has been released, configure placement of the selected movable action onto the position of the single placeholder surrounded by the visual emphasizing aid.

In another embodiment, the system, in response to identifying that a movable action has been selected, may determine, via the hardware processor, the location of the selected movable action; determine the location of the single placeholder; calculate the distance between the selected movable action and the single placeholder; increase the emphasis of the visual emphasizing aid when the selected movable action increases in proximity to the single placeholder, wherein the emphasis of the visual emphasizing aid continues to increase as the selected movable action continues to increase in proximity to the single placeholder; and decrease the emphasis of the visual emphasizing aid when the selected movable action decreases in proximity to the single placeholder, wherein the emphasis of the visual emphasizing aid continues to decrease as the selected movable action continues to decrease in proximity to the single placeholder.

Still other advantages, embodiments, and features of the subject disclosure—including devices and methods—will become readily apparent to those of ordinary skill in the art from the following description wherein there is shown and described a preferred embodiment of the present disclosure, simply by way of illustration of one of the best modes best suited to carry out the subject disclosure. As will be realized, the present disclosure is capable of other different embodiments and its several details are capable of modifications in various other embodiments all without departing from, or limiting, the scope herein.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE ILLUSTRATIVE EMBODIMENTS

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

An intelligent drag and drop designer ("Designer"), as disclosed herein, introduces intelligence into the graphical user interface of a workflow or form designer—making the experience of designing workflows and forms smarter, easier, and quicker. The Designer comprises a built-in intelligence that allows it to determine which placeholder is likely to be used or preferred and then visually emphasizes such placeholder to the user. One of its primary benefits is the removal of the cumbersome need for, and difficulties associated with, having to precisely move workflow/form actions directly onto a placeholder on a design canvas. Instead, the Designer enables the user to select the action, move it onto the design canvas, and release it, upon which the Designer automatically drops the action into the emphasized placeholder. The Designer also allows the user to emphasize alternative placeholders for selection by making only slight movements with the selected action. And when released, the Designer automatically drops the action into the emphasized placeholder selected by the user.

Figure 1:
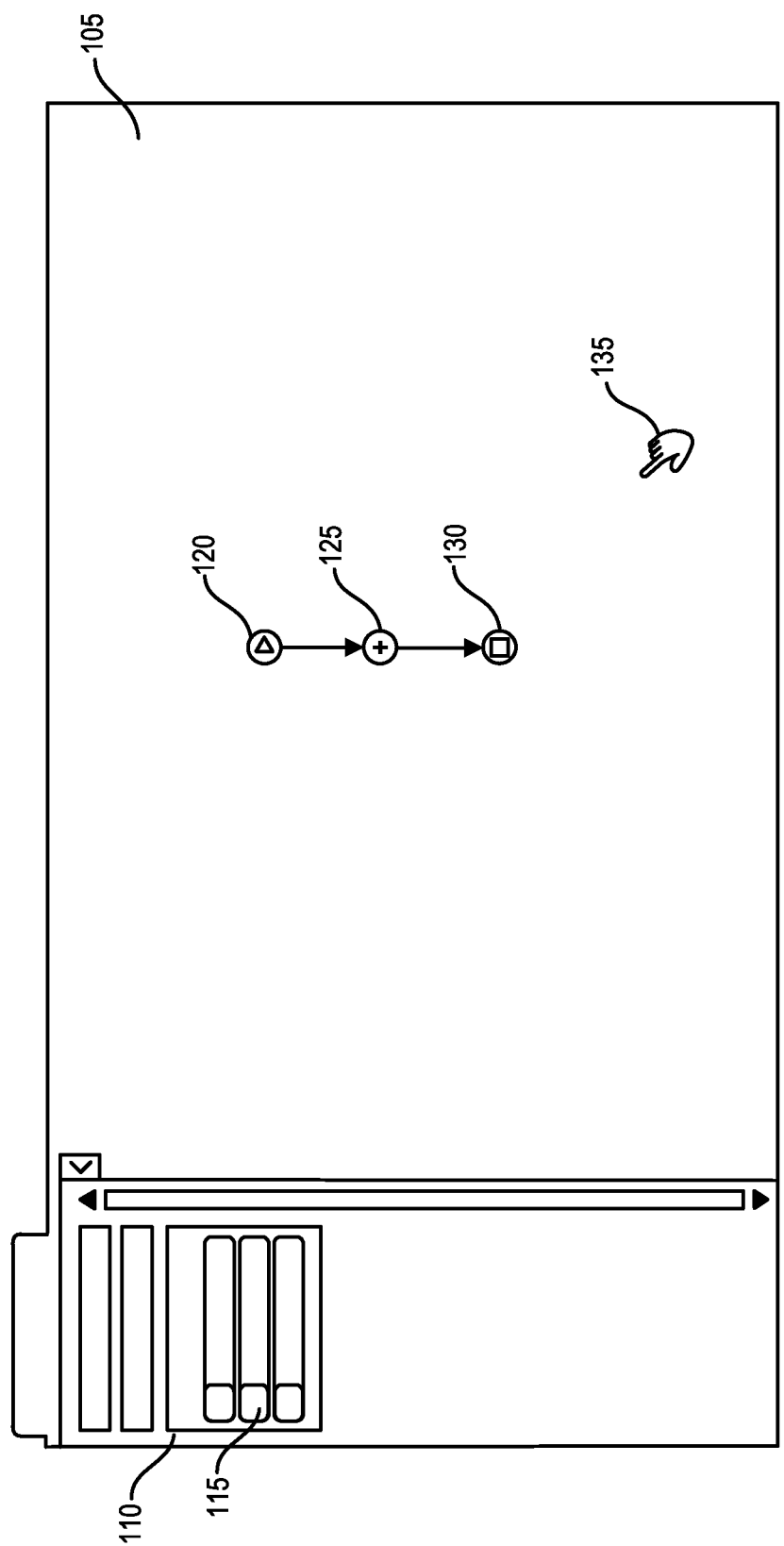
FIG. 1 is a functional diagram generally illustrating an embodiment of a graphical user interface for an intelligent drag and drop designer.

FIG. 1 is a functional diagram generally illustrating an embodiment of a graphical user interface for an intelligent drag and drop designer. A Designer's graphical user interface ("GUI") for designing workflows may comprise a design canvas 105, a cursor 135, and an action toolbox 110 with one or more movable actions 115. The design canvas 105 may comprise a workflow design, comprised of a start action 120, a placeholder 125, and a finish action 130.

A design canvas refers to the area on a Designer GUI where a user can design a form or workflow. A movable action refers to an entry that can be inputted into the design of a workflow or a form. Examples of movable actions for the design of workflows ("workflow actions") are: an action to branch a decision tree by conditions, an action to branch by values, and actions that include a condition precedent, running parallel paths, and calling a workflow. Examples of movable actions for the design of forms ("form actions") are: an action to insert barcodes, action to insert multiple choice options, and actions to insert timestamps, email options, images, and labels. A placeholder refers to a component that holds, denotes, or reserves a place into which a movable action may be inserted.

Figure 2A:
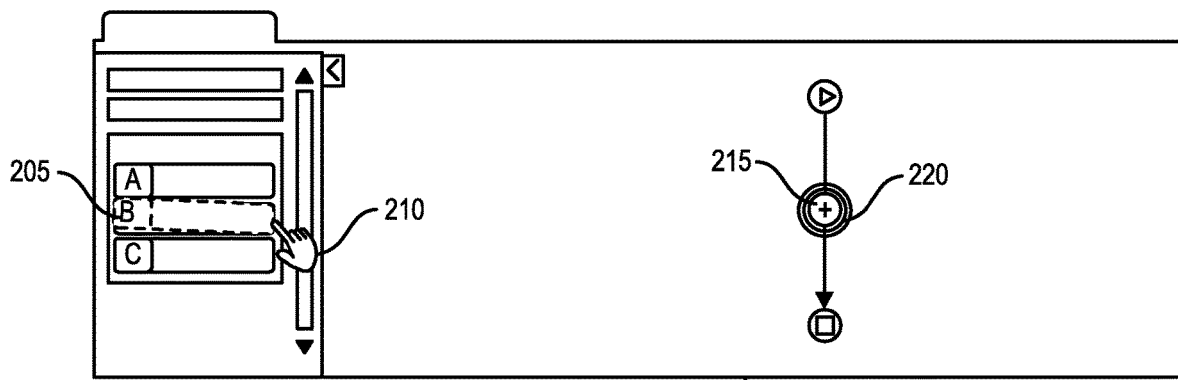
FIGS. 2A-2D disclose a functional flow diagram generally illustrating an embodiment of designing a workflow with an intelligent drag and drop designer.
Figure 2B:
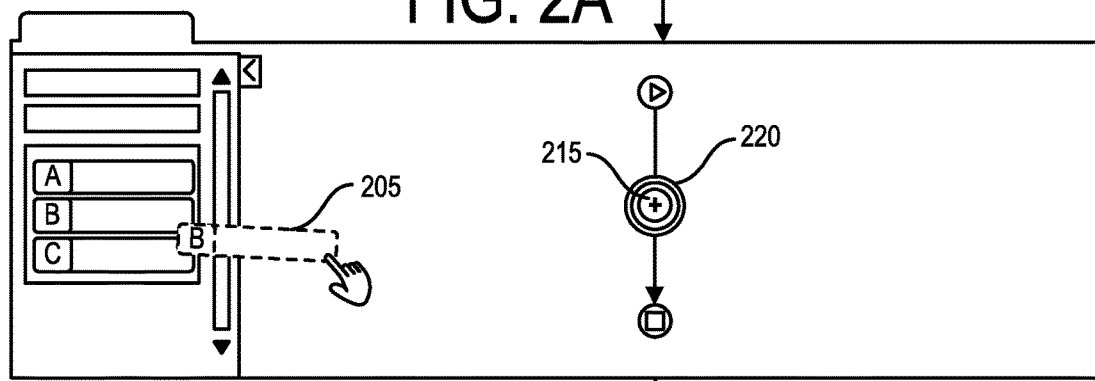
Figure 2C:
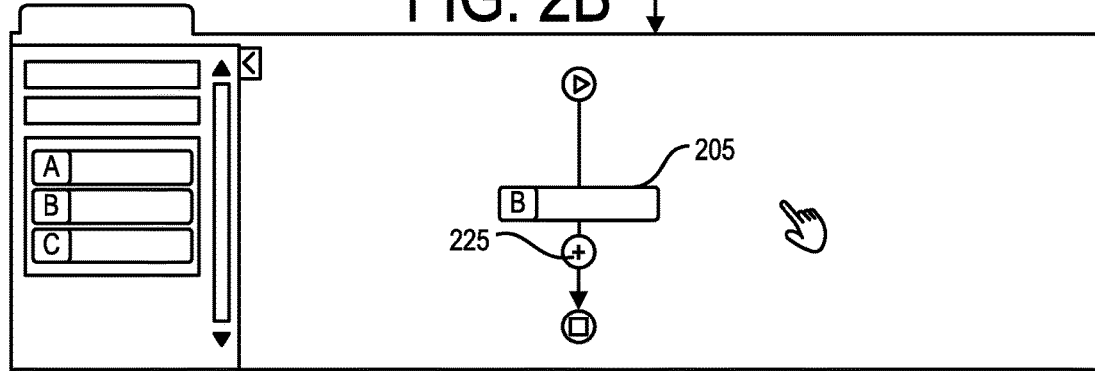
Figure 2D:
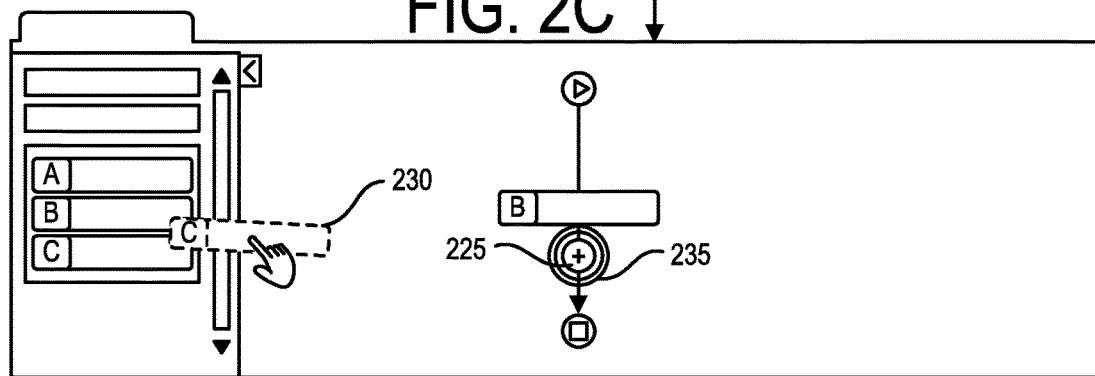

FIGS. 2A-2D disclose a functional flow diagram generally illustrating an embodiment of designing a workflow with an intelligent drag and drop designer. As shown in FIG. 2A, in designing a workflow, the Designer enables a user to select a movable action 205 with a cursor 210. Upon the action 205 being selected by the cursor 210 and moved slightly, the Designer generates and displays a visual aid 220 around a placeholder 215. As shown in FIG. 2B, as the action 205 is dragged closer to the placeholder 215, the Designer causes the visual aid 220 to increase in emphasis. The Designer allows the user to not be required to drag the action 205 directly into the position of the placeholder 215. Rather, the Designer allows the user to merely release the action 205, whereupon the action 205 is automatically placed into the position of the placeholder 215 that is currently being visually emphasized. FIG. 2C shows the action 205 after it has been released and automatically placed in position of the placeholder 215. Upon the action 205 being placed into the workflow design, the Designer may generate a new placeholder 225. FIG. 2D shows the Designer enabling the user to select another action 230, whereupon a visual aid 235 is generated and displayed around the new placeholder 225.

The Designer is compatible with any number of electronic devices and enables an action to be selected and released by multiple methods. Such methods may depend on the electronic device utilizing the Designer. For example, an action may be selected by a single holding click of a mouse and released by the release of the held click. Or, an action may be simultaneously selected and released by a double click of a mouse. The ability to select, release, and drop by a single double-click is possible only because the Designer provides a designated placeholder for the action to be automatically inserted into. An action may also be selected by a user selecting the action on a touch screen with only the user's fingers, or simultaneously selected and released by a user's swipe on a touch screen.

A visual aid surrounding a placeholder refers to a method by which visible emphasis is given to a placeholder. Thus, visual aids providing emphasis for a placeholder serve the purpose of a placeholder being made more visually prominent to the user when designing the form or workflow. Embodiments of a visual aid emphasis comprise a contrasting color that highlights the placeholder, circular/rectangular lines around the placeholder, and the placeholder itself being made bigger or bolder. As the user moves the selected action closer to the emphasized placeholder, the visual aid emphasis portrays the feeling of the placeholder pulling or attracting the selected action or an increased sensitivity by the placeholder. Being highlighted or magnetized are other descriptions used to reference the dynamic relationship between a selected action and the visual aid emphasis. In this relationship, as the selected action is moved closer to the visual aid, the visual aid emphasis "increases" in size; meaning, the visual aid grows/increases in prominence with the intent to draw more attention to it. Embodiments of a visual aid increasing in emphasis/prominence comprise: a contrasting color increasing in darkness, brightness, or size; circular/rectangular lines increasing in thickness, quantity, or size; and the placeholder continually increasing in size.

Figure 3:
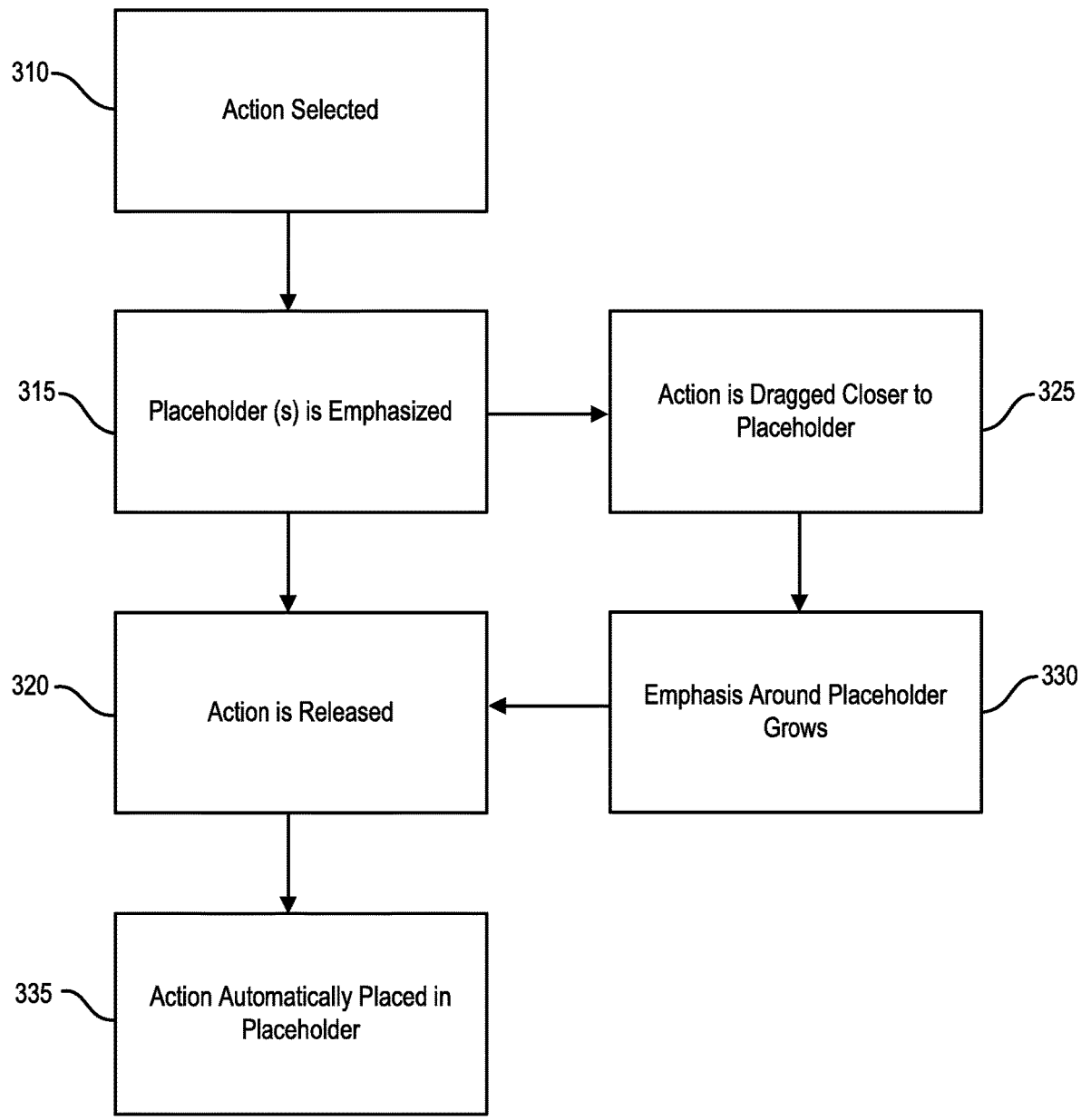
FIG. 3 is a functional block diagram generally illustrating an embodiment of a method for using an intelligent drag and drop designer to design a workflow or form.

FIG. 3 is a functional block diagram generally illustrating an embodiment of a method for using an intelligent drag and drop designer to design a workflow or form. The method for designing either a workflow or form begins when the Designer identifies or detects that an action is selected 310. When the action is selected 310, the Designer generates and displays a visual emphasizing aid around a single placeholder 315. Once the Designer detects that the selected action 310 is released 320, the Designer automatically places the action 335 onto the placeholder that was visually emphasized. Alternatively, the Designer may detect that the user is dragging 325 the selected action closer to the placeholder, whereupon the Designer causes the visual aid around the placeholder to increase in emphasis 330. Regardless of the action's proximity to the placeholder, when the Designer detects that the the user has released 320 the action, the Designer automatically places 335 the action into the selected placeholder.

Figure 4:
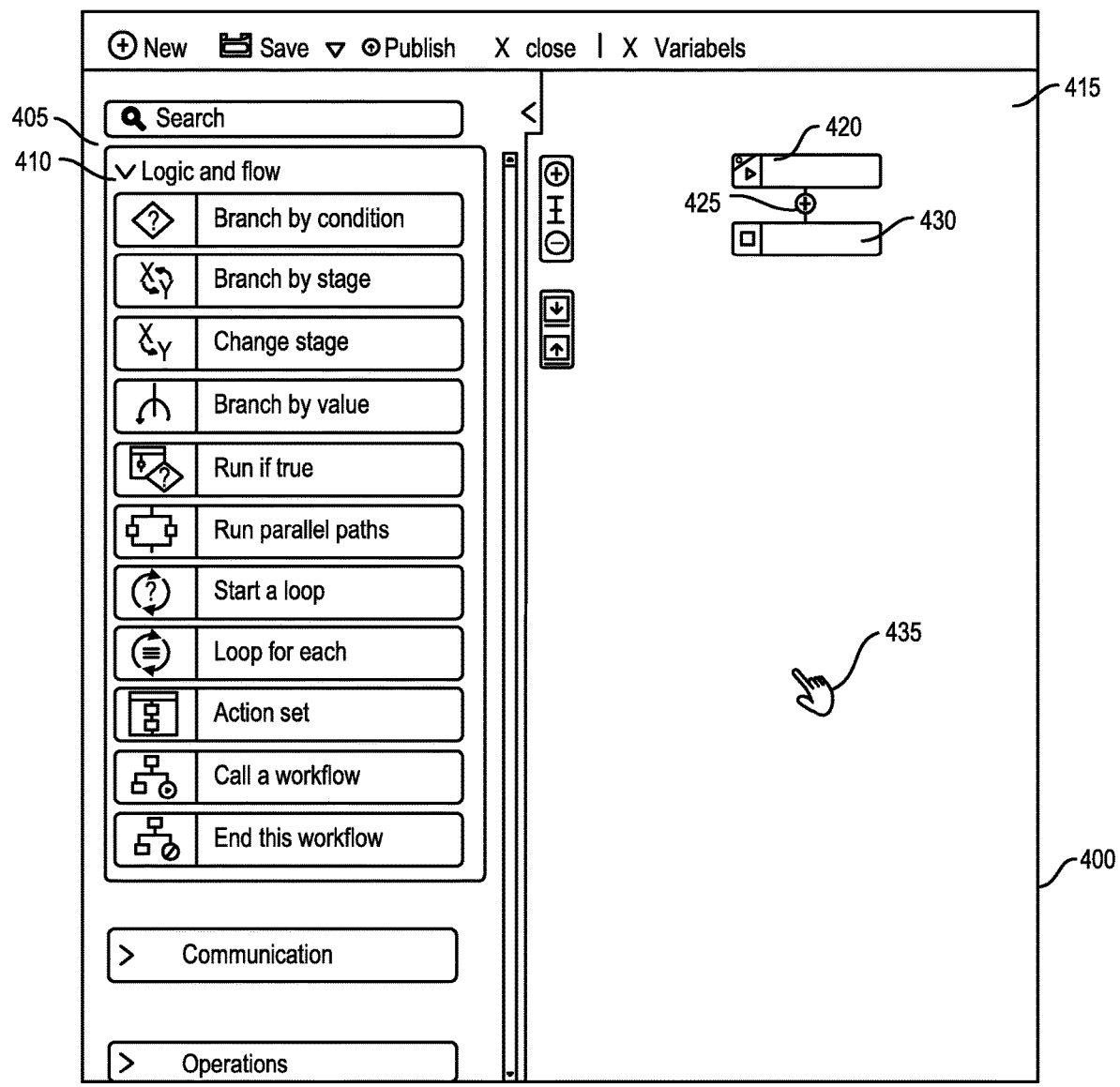
FIG. 4 generally illustrates an embodiment of a graphical user interface of an intelligent drag and drop designer for designing a workflow.

FIG. 4 generally illustrates an embodiment of a graphical user interface of an intelligent drag and drop designer for designing a workflow. As shown in FIG. 4, a Designer may comprise a GUI 400 that may be used to create a workflow. The workflow GUI 400 may comprise a toolbox 405 with movable workflow actions 410, a design canvas 415, a start action 420, a placeholder 425, a stop action 430, and a cursor 435. The workflow GUI 400 enables a user to select a workflow action 410 to place onto the placeholder 425. When the workflow action 410 is selected, a visual aid appears around the placeholder 425, increasing in emphasis as the workflow action 410 is brought closer to the placeholder 425. Once a workflow action 410 is placed onto the placeholder 425, a new placeholder appears.

Figure 5:
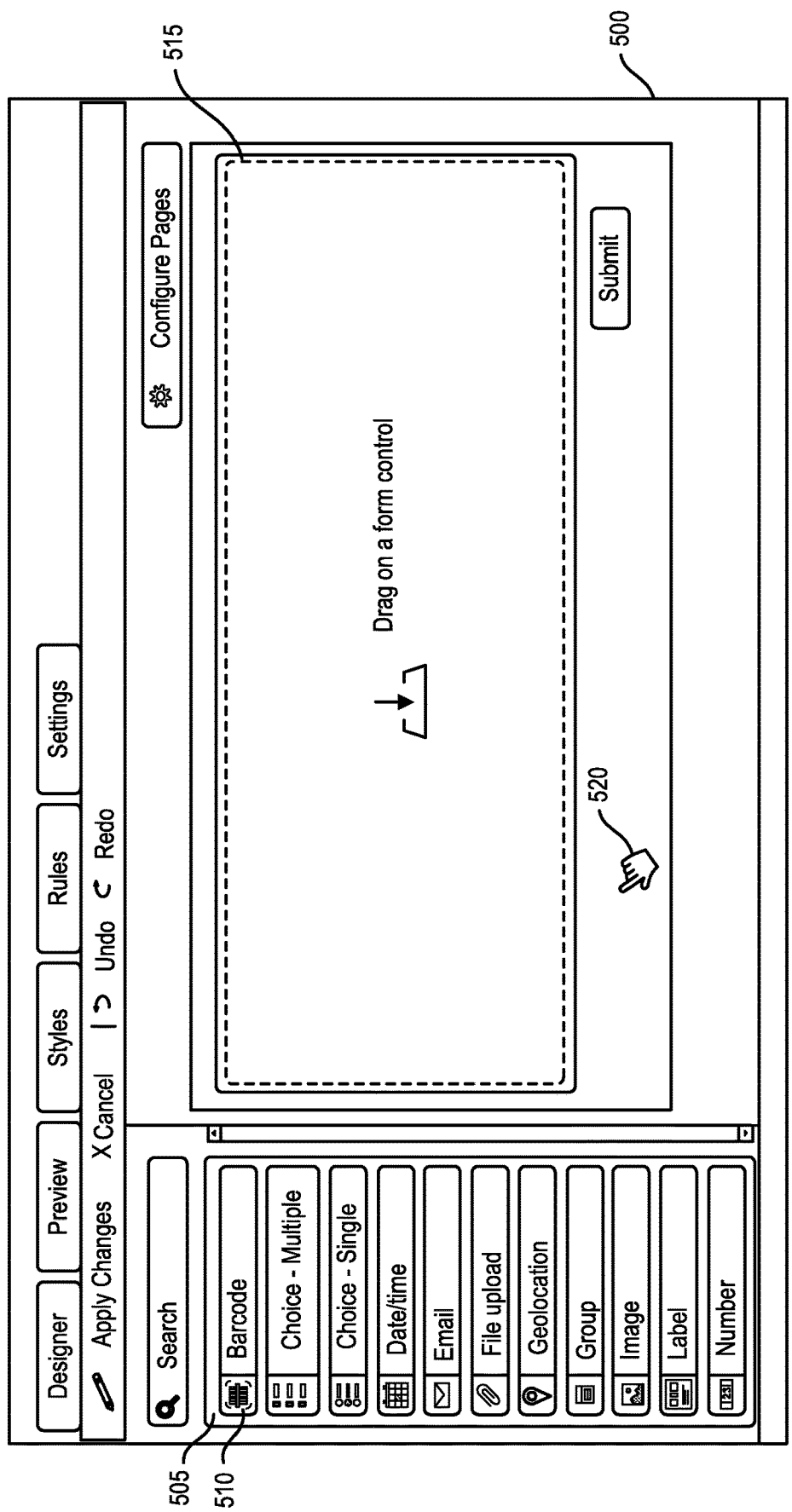
FIG. 5 generally illustrates an embodiment of a graphical user interface of an intelligent drag and drop designer for designing a form.

FIG. 5 generally illustrates an embodiment of a graphical user interface of an intelligent drag and drop designer for designing a form. As shown in FIG. 5, a Designer may comprise a GUI 500 that may be used to create a form. The form GUI 500 may comprise a toolbox 505 with movable form actions 510, a design canvas 515, and a cursor 520. The form GUI 500 allows for a user to select a form action 510 to place onto the design canvas 515. When the Designer detects that a form action 510 is selected, it generates and displays a visual aid around the location for insertion of the form action 510, increasing in emphasis as the form action 510 is brought closer to the location. Once the Designer detects that the form action 510 has been placed onto the emphasized location in the design canvas 515, the Designer determines which placeholder should be emphasized and emphasizes a new location when it detects that a new form action 510 is selected.

In an embodiment, when a workflow is first designed, the Designer displays only one placeholder. As a result of it being the only placeholder displayed, it will be the only placeholder emphasized when a user selects an action. After an action is dropped into the first placeholder the Designer will automatically generate and display a new placeholder directly after the previously added action.

In another embodiment, when a workflow has a branching option for the placement of two or more actions, wherein the branches are numbered from left to right, the Designer may as a default, emphasize the placeholder in the first branch. In one embodiment, as an action is moved around a design, the Designer may expand and collapse in size the target zones within the workflow/form design by determining the proximity of the selected action to the target zones. In other embodiments, the Designer allows for pre-configuration of settings such that specified placeholders are emphasized by default.

The Designer may also distinguish and differentiate between the presence of multiple placeholders in a workflow or form design and determine which placeholder the user is intending to select. In one embodiment for determining which placeholder the user is intending to select, the Designer may, by default, automatically visually emphasize a placeholder, such as the placeholder closest to the toolbox. For example, if the toolbox is on the left side of the GUI, the farthest left placeholder is automatically visually emphasized when a selected action is moved onto the canvas. In such an embodiment, the Designer is sufficiently intelligent so as to sense the direction of the action's movement in relation to its original placement on the canvas and determine which placeholder is intended to be selected by what direction the action is moved in. For example, if the action is moved in the right direction in relation to its original placement on the canvas, a placeholder to the right of the previously emphasized placeholder is visually emphasized. If the action is moved in the down direction in relation to its original placement on the canvas, a placeholder below the previously emphasized placeholder is visually emphasized.

In another embodiment of the Designer determining which placeholder the user is intending to select, as a selected action is moved across a canvas the Designer is sufficiently intelligent so as to identify the location of the selected action and its proximity to the location of all existing placeholders. The Designer determines the distance between the selected action and other placeholders, compares the distances, ascertains which placeholder is closest in proximity to the action, and generates a visual emphasis for the closest placeholder. As the selected action is moved and changes location, the Designer reevaluates the proximity of all placeholders and continues to generate a visual emphasis for the closest placeholder, changing visual emphasis as needed from one placeholder to another. When the Designer visually emphasizes a placeholder, it does not visually emphasize other placeholders.

In other embodiments, the Designer may comprise functionalities that incorporate aspects of all the above embodiments, wherein the Designer may sense both the proximity of placeholders in relation to an action and also sense the direction in which the action is moved.

Figure 6A:
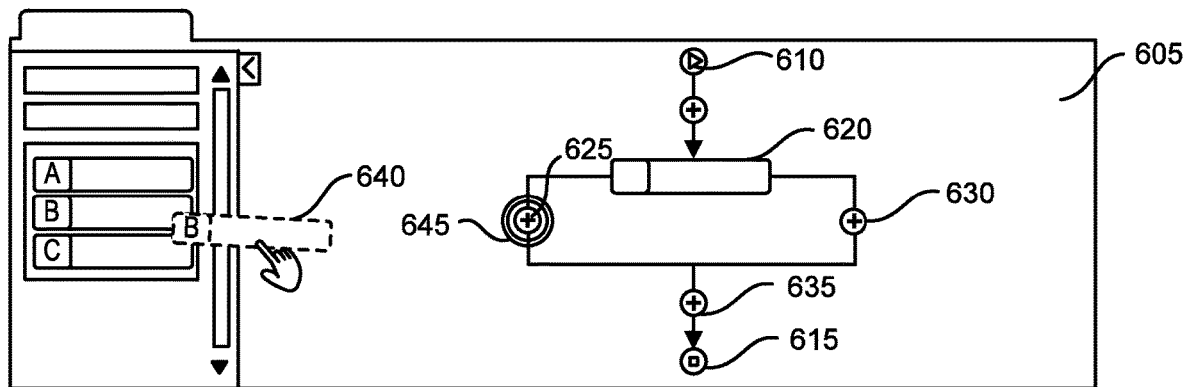
FIGS. 6A-6C disclose a functional flow diagram generally illustrating an embodiment of selecting from a branching action's two or more placeholders when designing a workflow with an intelligent drag and drop designer.
Figure 6B:
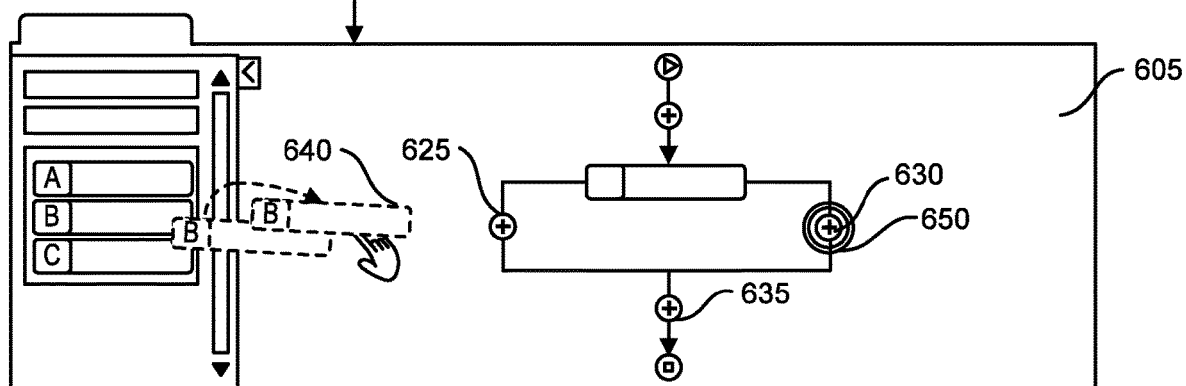
Figure 6C:
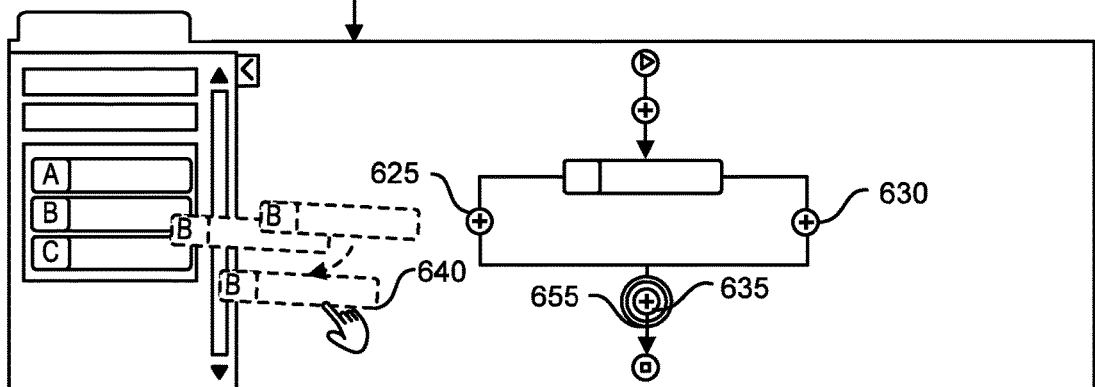

FIGS. 6A-6C disclose a functional flow diagram generally illustrating an embodiment of selecting from a branching action's two or more placeholders when designing a workflow with an intelligent drag and drop designer. In FIG. 6A, the Designer's design canvas 605 displays a workflow design with a start action 610, a stop action 615, an inputted branching action 620 with a first placeholder 625 and a second placeholder 630, and a separate, third placeholder 635. After an action 640 has been selected, the Designer detects that the user has dragged the action 640 onto the canvas 605. The Designer recognizes the presence of the action 640 on the canvas 605, determines that the first placeholder 625 is closest, and visually emphasizes 645 the first placeholder 625. Because the first placeholder 625 is visually emphasized 645, the second placeholder 630, and the third placeholder 635 are not visually emphasized. As shown in FIG. 6B, when the selected action 640 is moved away from the first placeholder 625 and in the direction of the second placeholder 630, the Designer determines that the movement of the selected action 640 is in the direction of the second placeholder 630 and generates a visual emphasis 650 around the second placeholder 630. Similarly, as shown in FIG. 6C, when the selected action 640 is moved in the direction of the third placeholder 635, the third placeholder 635 is visually emphasized 655.

Additional intelligence by the Designer may comprise machine learning capabilities. Embodiments of machine learning capabilities comprise the Designer taking into account probabilities for two or more displayed placeholders and emphasizing the placeholder with the highest probability. Such probabilities may be based on a form or workflow's subject matter, substantive data, pattern of previous selections, appropriate/likely grouping, and prior user history. Machine learning capabilities may also comprise a Designer that can identify an action inputted incorrectly and generating appropriate notifications.

Figure 7:
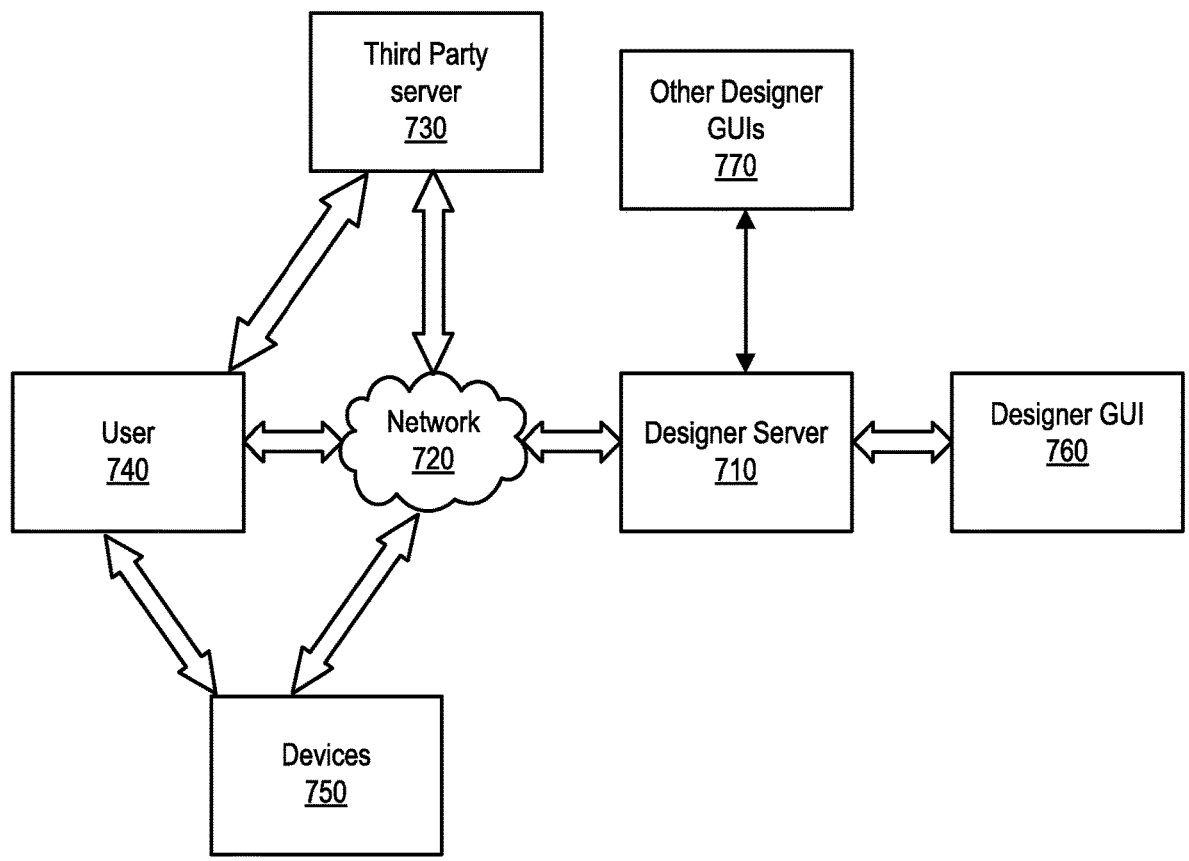
FIG. 7 is a functional block diagram generally illustrating an embodiment of a network system for an intelligent drag and drop designer.

FIG. 7 is a functional block diagram generally illustrating an embodiment of a network system for an intelligent drag and drop designer. A network system, as shown in FIG. 7, may comprise a Designer server 710 accessible over a local area network or a wide area network 720, such as the Internet. The Designer server 710 may enable third party servers 730, users 740, and electronic devices 750 to connect to a Designer GUI 760. The Designer server 710 may also host additional design GUIs 770, each accessible to their respective owners and other users.

In accordance with the preferred embodiment, the Designer server 710 is remotely accessible by a number of user computing devices 750, including for example, laptops, smartphones, computers, tablets, and other computing devices that are able to access the local area network or a wide area network where the Designer server 710 resides. In normal operation, each user electronic device 750 connects with the Designer server 710 to interact with the Designer GUI 760 and the additional Designer GUIs 770. As is also known, each additional Designer GUI 770 may employ a number of connectors to interact with third party 730 servers and their data, services, or applications.

Figure 8:
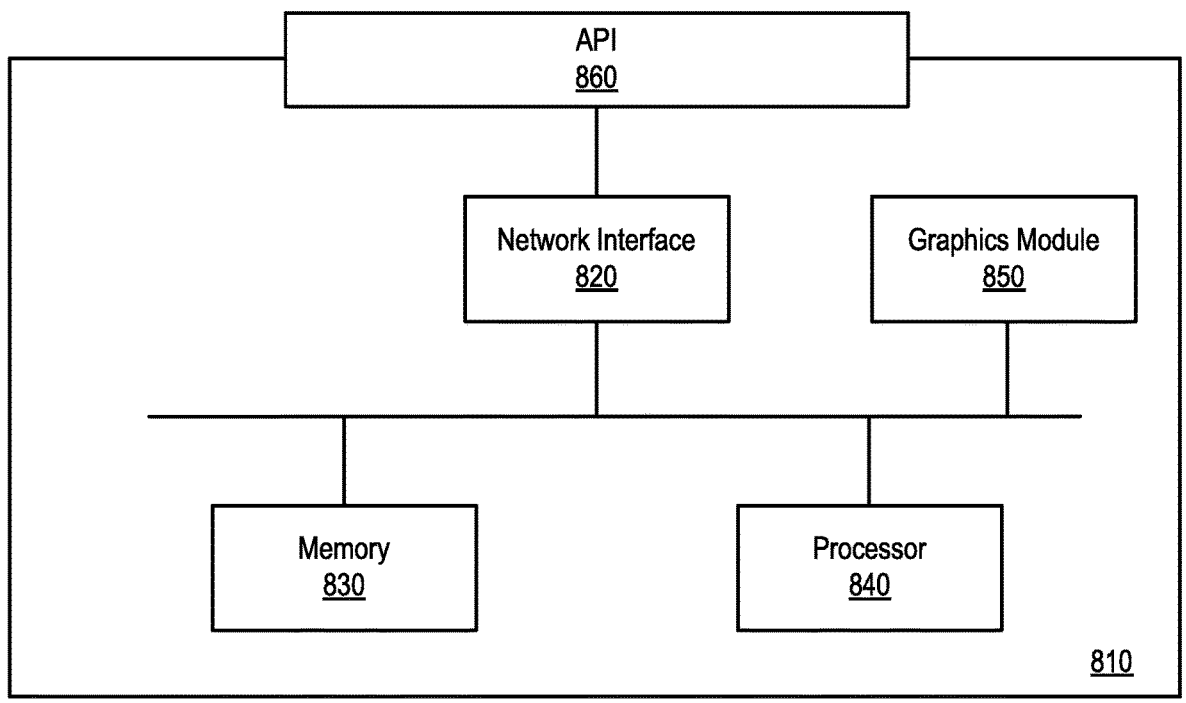
FIG. 8 is a functional block diagram generally illustrating an embodiment of an electronic device system for an intelligent drag and drop designer.

FIG. 8 is a functional block diagram generally illustrating an embodiment of an electronic device system for an intelligent drag and drop designer. The electronic device 810 may be coupled to a Designer server 710 via a network interface 820. The electronic device 810 generally comprises a memory 830, a processor 840, a graphics module 850, and an application programming interface 860. The electronic device 810 is not limited to any particular configuration or system.

As used in the specification and the appended claims, the singular forms "a," "an," and "the" include plural referents unless the context clearly dictates otherwise. Throughout the description and claims of this specification, the word "comprise" and variations of the word, such as "comprising" and "comprises," means "including but not limited to," and is not intended to exclude, for example, other components, integers or steps. "Exemplary" or "For Example" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

Embodiments of the systems and methods are described with reference to schematic diagrams, block diagrams, and flowchart illustrations of methods, systems, apparatuses and computer program products. It will be understood that each block of the block diagrams, schematic diagrams, and flowchart illustrations, and combinations of blocks in the block diagrams, schematic diagrams, and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

Other embodiments may comprise overlay features demonstrating relationships between one more steps, active users, previous users, missing steps, errors in the workflow, analytical data from use of the workflow, future use of the workflow, and other data related to the workflow, users, or the relationship between the workflow and users.

Furthermore, the disclosure here may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order; it is in no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

What is claimed is:

1. A system for an intelligent designer, comprising:
   A computer system having a hardware processor and a physical memory using executable instructions that, as a result of being executed by the hardware processor, cause the computer system to:
   generate and display, via the hardware processor, a graphical user interface comprising a design canvas, wherein the design canvas comprises at least one movable action and one or more placeholders for placement of the at least one movable action;
   identify, via the hardware processor, when a movable action has been selected;
   in response to identifying that the movable action has been selected, generate and display, via the hardware processor, a visual emphasizing aid surrounding a single placeholder;
   determine, via the hardware processor, when the selected movable action has been released; and
   in response to determining that the selected movable action has been released, configure placement of the selected movable action, via the hardware processor, onto the position of the single placeholder surrounded by the visual emphasizing aid.

2. The system of claim 1, wherein the executable instructions further comprise instructions that, as a result of being executed by the hardware processor, cause the computer system to:
   in response to identifying that the movable action has been selected, determine, via the hardware processor, a location of the selected movable action;
   determine, via the hardware processor, a location of the single placeholder;
   calculate, via the hardware processor, a distance between the selected movable action and the single placeholder;
   increase an emphasis of the visual emphasizing aid when the selected movable action increases in proximity to the single placeholder, wherein the emphasis of the visual emphasizing aid continues to increase as the selected movable action continues to increase in proximity to the single placeholder; and
   decrease the emphasis of the visual emphasizing aid when the selected movable action decreases in proximity to the single placeholder, wherein the emphasis of the visual emphasizing aid continues to decrease as the selected movable action continues to decrease in proximity to the single placeholder.

3. The system of claim 2, wherein the visual emphasizing aid comprises one or more of the following: a color, a solid line, a dashed line, and combinations thereof.

4. The system of claim 1, wherein the executable instructions further comprise instructions that, as a result of being executed by the hardware processor, cause the computer system to:
   in response to identifying that the movable action has been selected, determine, via the hardware processor, a location of the selected movable action;
   determine, via the hardware processor, a location of the single placeholder;
   determine, via the hardware processor, a location of one or more additional placeholders;
   calculate, via the hardware processor, a distance between the location of the selected movable action and the location of the single placeholder;
   calculate, via the hardware processor, a distance between the location of the selected movable action and the location of the one or more additional placeholders;
   determine, via the hardware processor, which one of the one or more additional placeholders is closest in proximity to the selected movable action; and
   generate and display, via the hardware processor, the visual emphasizing aid surrounding the one placeholder determined to be closest in proximity to the selected movable action.

5. The system of claim 1, wherein the movable action comprises either a workflow action or a form action.

6. The system of claim 1, wherein the executable instructions further comprise instructions that, as a result of being executed by the hardware processor, cause the computer system to:
   generate and display, via the hardware processor, a placeholder directly below the single placeholder upon the configured placement of the selected movable action onto the position of the single placeholder.

7. The system of claim 1, wherein the executable instructions further comprise instructions that, as a result of being executed by the hardware processor, cause the computer system to:
   in response to identifying that the movable action has been selected, determine, via the hardware processor, a location of the selected movable action;
   determine, via the hardware processor, a location of at least two placeholders;
   calculate, via the hardware processor, a distance between the location of the selected movable action and the location of the at least two placeholders;
   determine, via the hardware processor, which one of the at least two placeholders is the farthest left placeholder of the at least two placeholders; and
   generate and display, via the hardware processor, the visual emphasizing aid surrounding the one place placeholder determined to be the farthest left placeholder.

8. A method for an intelligent designer, comprising:
   generating and displaying, via a hardware processor, a graphical user interface comprising a design canvas, wherein the design canvas comprises at least one movable action and one or more placeholders for the at least one movable action;
   identifying, via the hardware processor, when a movable action has been selected;
   in response to identifying that the movable action has been selected, generating and displaying, via the hardware processor, a visual emphasizing aid surrounding a single placeholder;
   determining, via the hardware processor, when the selected movable action has been released; and
   in response to determining that the selected movable action has been released, configuring placement of the selected movable action, via the hardware processor, onto the position of the single placeholder surrounded by the visual emphasizing aid.

9. The method of claim 8, further comprising:
in response to identifying that the movable action has been selected, determining, via the hardware processor, a location of the selected movable action;
determining, via the hardware processor, a location of the single placeholder;
calculating, via the hardware processor, a distance between the selected movable action and the single placeholder;
increasing an emphasis of the visual emphasizing aid when the selected movable action increases in proximity to the single placeholder, wherein the emphasis of the visual emphasizing aid continues to increase as the selected movable action continues to increase in proximity to the single placeholder; and
decreasing the emphasis of the visual emphasizing aid when the selected movable action decreases in proximity to the single placeholder, wherein the emphasis of the visual emphasizing aid continues to decrease as the selected movable action continues to decrease in proximity to the single placeholder.

10. The method of claim 9, wherein the visual emphasizing aid comprises one or more of the following: a color, a solid line, a dashed line, and combinations thereof.

11. The method of claim 8, further comprising:
in response to identifying that the movable action has been selected, determining, via the hardware processor, a location of the selected movable action;
determining, via the hardware processor, a location of the single placeholder;
determining, via the hardware processor, a location of one or more additional placeholders;
calculating, via the hardware processor, a distance between the location of the selected movable action and the location of the single placeholder;
calculating, via the hardware processor, a distance between the location of the selected movable action and the location of the one or more additional placeholders;
determining, via the hardware processor, which one of the one or more additional placeholders is closest in proximity to the selected movable action; and
generating and displaying, via the hardware processor, the visual emphasizing aid surrounding the one placeholder determined to be closest in proximity to the selected movable action.

12. The method of claim 8, wherein the movable action comprises either a workflow action or a form action.

13. The method of claim 8, further comprising:
generating and displaying, via the hardware processor, a placeholder directly below the single placeholder upon the configured placement of the selected movable action onto the position of the single placeholder.

14. The method of claim 8, further comprising:
in response to identifying that the movable action has been selected, determining, via the hardware processor, a location of the selected movable action;
determining, via the hardware processor, a location of at least two placeholders;
calculating, via the hardware processor, a distance between the location of the selected movable action and the location of the at least two placeholders;
determining, via the hardware processor, which one of the at least two placeholders is the farthest left placeholder of the at least two placeholders; and
generating and displaying, via the hardware processor, the visual emphasizing aid surrounding the one place placeholder determined to be the farthest left placeholder.

15. A device for facilitating use of an intelligent designer, comprising a processor and a memory operatively coupled to the processor, the memory containing instructions executable by the processor to cause the device to:
generate and display, via a hardware processor, a graphical user interface comprising a design canvas, wherein the design canvas comprises at least one movable action and one or more placeholders for the at least one movable action;
identify, via the hardware processor, when a movable action has been selected;
in response to identifying that the movable action has been selected, generate and display, via the hardware processor, a visual emphasizing aid surrounding a single placeholder;
determine, via the hardware processor, when the selected movable action has been released; and
in response to determining that the selected movable action has been released, configure placement of the selected movable action, via the hardware processor, onto the position of the single placeholder surrounded by the visual emphasizing aid.

16. The device of claim 15, wherein the memory contains additional instructions executable by the processor to cause the device to:
in response to identifying that the movable action has been selected, determine, via the hardware processor, a location of the selected movable action;
determine, via the hardware processor, a location of the single placeholder;
calculate, via the hardware processor, a distance between the selected movable action and the single placeholder;
increase an emphasis of the visual emphasizing aid when the selected movable action increases in proximity to the single placeholder, wherein the emphasis of the visual emphasizing aid continues to increase as the selected movable action continues to increase in proximity to the single placeholder; and
decrease the emphasis of the visual emphasizing aid when the selected movable action decreases in proximity to the single placeholder, wherein the emphasis of the visual emphasizing aid continues to decrease as the selected movable action continues to decrease in proximity to the single placeholder.

17. The device of claim 16, wherein the visual emphasizing aid comprises one or more of the following: a color, a solid line, a dashed line, and combinations thereof.

18. The device of claim 15, wherein the memory containing additional instructions executable by the processor to cause the device to:
in response to identifying that the movable action has been selected, determine, via the hardware processor, a location of the selected movable action;
determine, via the hardware processor, a location of the single placeholder;
determine, via the hardware processor, a location of one or more additional placeholders;
calculate, via the hardware processor, a distance between the location of the selected movable action and the location of the single placeholder;
calculate, via the hardware processor, a distance between the location of the selected movable action and the location of the one or more additional placeholders;

determine, via the hardware processor, which one of the one or more additional placeholders is closest in proximity to the selected movable action; and generate and display, via the hardware processor, the visual emphasizing aid surrounding the one placeholder determined to be closest in proximity to the selected movable action.

19. The device of claim 15, wherein the movable action comprises either a workflow action or a form action.

20. The device of claim 15, wherein the memory containing additional instructions executable by the processor to cause the device to:

generate and display, via the hardware processor, a placeholder directly below the single placeholder upon the configured placement of the selected movable action onto the position of the single placeholder.

* * * * *